United States Patent
Sham

(10) Patent No.: US 10,745,050 B2
(45) Date of Patent: Aug. 18, 2020

(54) AUTOMATED VEHICLE PARKING

(71) Applicant: Wellen Sham, Taipei (TW)

(72) Inventor: Wellen Sham, Taipei (TW)

(*) Notice: Subject to any disclaimer, the term of this patent is extended or adjusted under 35 U.S.C. 154(b) by 89 days.

(21) Appl. No.: 15/704,283

(22) Filed: Sep. 14, 2017

(65) Prior Publication Data
US 2018/0001930 A1 Jan. 4, 2018

Related U.S. Application Data

(63) Continuation-in-part of application No. 15/097,293, filed on Apr. 13, 2016, now Pat. No. 9,827,983.
(Continued)

(51) Int. Cl.
*B62D 15/02* (2006.01)
*G01C 21/36* (2006.01)
(Continued)

(52) U.S. Cl.
CPC .......... *B62D 15/0285* (2013.01); *B60L 53/22* (2019.02); *B60W 30/06* (2013.01); *G01C 21/3685* (2013.01); *G01S 5/0027* (2013.01); *G01S 5/0263* (2013.01); *G01S 15/86* (2020.01); *G01S 15/931* (2013.01); *G01S 17/931* (2020.01);
(Continued)

(58) Field of Classification Search
CPC .......... B62D 15/0285; B60L 11/1812; B60W 30/06; G01C 21/3685; G01S 5/0027; G01S 5/0263; G01S 17/023; G01S 19/42; G05D 1/0088; G08G 1/146; G08G 1/148
See application file for complete search history.

(56) References Cited

U.S. PATENT DOCUMENTS 9,371,007 B1 * 6/2016 Penilla ................ B60L 11/1848
9,827,983 B2 11/2017 Sham
(Continued)

FOREIGN PATENT DOCUMENTS

EP 2207350 A1 7/2010
EP 2772414 A2 9/2014
(Continued)

OTHER PUBLICATIONS

European Office Action for EP16194301 dated Apr. 13, 2017, all pages.
(Continued)

*Primary Examiner* — Aaron L Troost
(74) *Attorney, Agent, or Firm* — Kilpatrick Townsend & Stockton, LLP

(57) ABSTRACT

Systems and methods for automatically parking and wirelessly charging a vehicle are described. A database including parking and charging availability information can be searched based at least in part on the request, location information and model information of the vehicle. An available parking space is determined based on the results of the search, and information. The parking space may be equipped with a pad configured to wireless charge a vehicle parked in the parking space. When information indicating that the vehicle has been parked in the parking space, a parking status indicating such can be transmitted to a control device associated with the parking space. The vehicle can then be automatically and wirelessly charged by the control device through the parking space.

18 Claims, 14 Drawing Sheets

Related U.S. Application Data

(60) Provisional application No. 62/259,613, filed on Nov. 24, 2015.

(51) Int. Cl.

| | | |
|---|---|---|
| *G05D 1/00* | (2006.01) | |
| *G08G 1/14* | (2006.01) | |
| *B60W 30/06* | (2006.01) | |
| *G01S 5/02* | (2010.01) | |
| *G01S 5/00* | (2006.01) | |
| *B60L 53/22* | (2019.01) | |
| *G01S 15/931* | (2020.01) | |
| *G01S 15/86* | (2020.01) | |
| *G01S 17/931* | (2020.01) | |
| *G01S 19/42* | (2010.01) | |

(52) U.S. Cl.
CPC ........... *G05D 1/0088* (2013.01); *G08G 1/146* (2013.01); *G08G 1/148* (2013.01); *G01S 19/42* (2013.01); *G01S 2015/932* (2013.01)

(56) References Cited

U.S. PATENT DOCUMENTS

| | | |
|---|---|---|
| 2007/0146165 A1 | 6/2007 | Tanaka |
| 2008/0140286 A1 | 6/2008 | Jung |
| 2012/0188100 A1 | 7/2012 | Min et al. |
| 2012/0256766 A1 | 10/2012 | Lavoie |
| 2013/0085637 A1 | 4/2013 | Grimm et al. |
| 2013/0132270 A1* | 5/2013 | Cheung ................ G07F 15/005 705/39 |
| 2014/0240502 A1 | 8/2014 | Strauss et al. |
| 2014/0320318 A1 | 10/2014 | Victor et al. |
| 2015/0066545 A1 | 3/2015 | Kotecha et al. |
| 2015/0149265 A1 | 5/2015 | Huntzicker et al. |
| 2015/0241241 A1 | 8/2015 | Cudak et al. |
| 2015/0353080 A1* | 12/2015 | Mukaiyama ............ E05B 77/54 701/23 |
| 2016/0068158 A1 | 3/2016 | Elwart et al. |
| 2016/0163122 A1 | 6/2016 | Mandelkow et al. |
| 2016/0362050 A1 | 12/2016 | Lee et al. |
| 2017/0083025 A1* | 3/2017 | Rosas-Maxemin .... G08G 1/149 |
| 2017/0144654 A1 | 5/2017 | Sham |
| 2018/0072311 A1 | 3/2018 | Sham |

FOREIGN PATENT DOCUMENTS

| | | | |
|---|---|---|---|
| WO | 2013127666 A1 | 9/2013 | |
| WO | WO-2015051876 A1 * | 4/2015 | .............. B60L 53/60 |

OTHER PUBLICATIONS

U.S. Appl. No. 15/097,293, filed Apr. 13, 2016, Non-Final Rejection dated Jun. 17, 2016, all pages.
U.S. Appl. No. 15/097,293, filed Apr. 13, 2016, Final Rejection dated Jan. 2, 2017, all pages.
U.S. Appl. No. 15/097,293, filed Apr. 13, 2016, Non-Final Rejection dated Apr. 5, 2017, all pages.
U.S. Appl. No. 15/097,293, filed Apr. 13, 2016, Notice of Allowance dated Jul. 24, 2017, all pages.
EP Office Action dated Feb. 15, 2019 in the corresponding EP application(application No. 16194301.4).
U.S. Appl. No. 15/812,154 ,"Non-Final Office Action", dated Jan. 11, 2019, 7 pages.

* cited by examiner

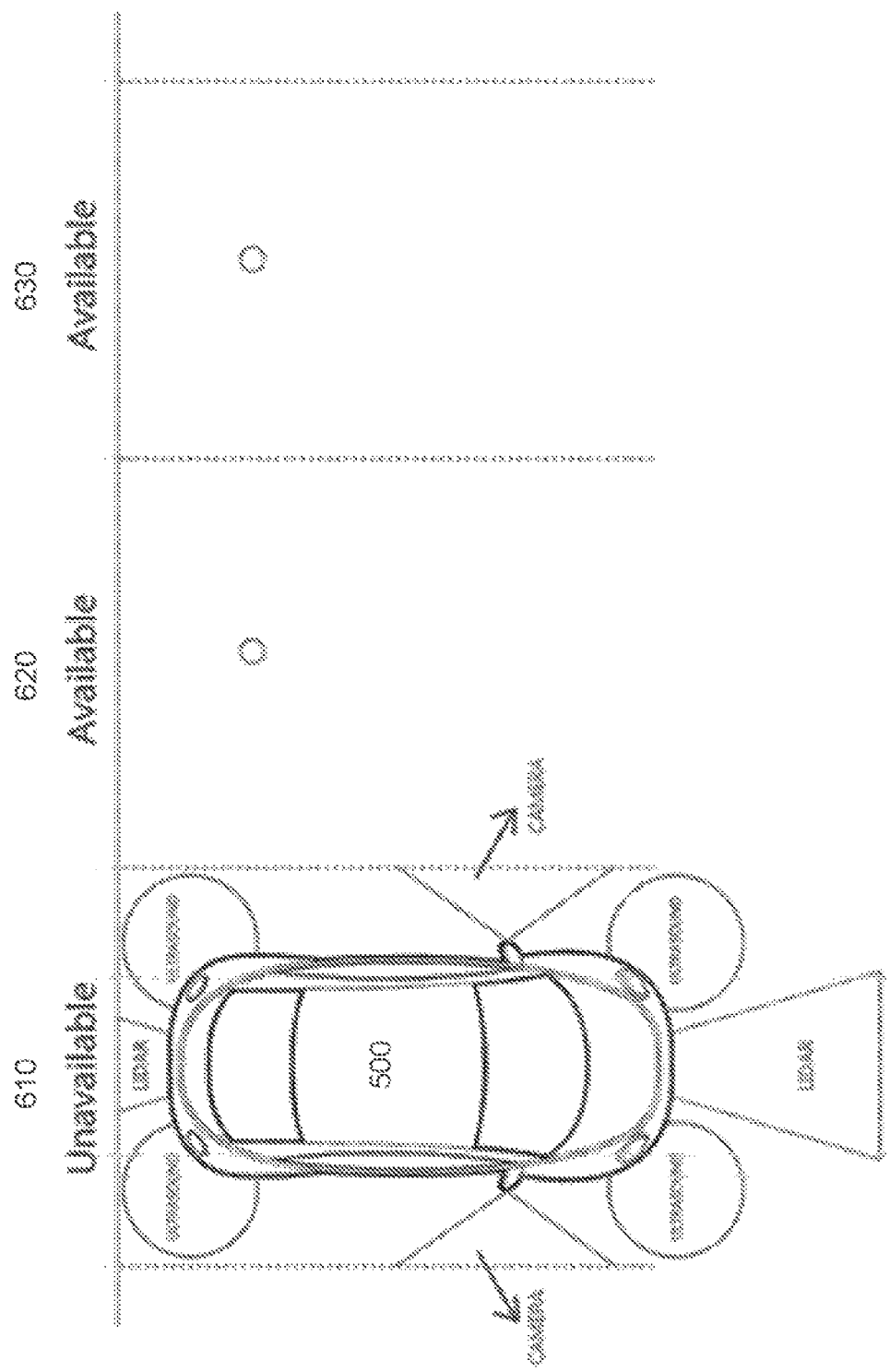

AUTOMATED VEHICLE PARKING

CROSS-REFERENCE TO RELATED APPLICATIONS

The present application is a continuation-in-part of U.S. Non-provisional patent application Ser. No. 15/097,293, filed on Apr. 13, 2016, entitled "AUTOMATED VEHICLE PARKING", which claims priority to U.S. Provisional Application No. 62/259,613, filed on Nov. 24, 2015, entitled "AUTOMATED VEHICLE PARKING", the disclosures of which are hereby incorporated by reference in their entireties for all purposes.

BACKGROUND

Exemplary embodiments of the present disclosure relate to automated parking systems and methods that may be used, for example, for motor vehicles, including electric vehicles.

Vehicle operators spend countless hours looking for parking spaces in congested areas. This can be frustrating, time consuming, and (in extreme cases) can even lead to controversies over who has the right to an open parking space.

Parking garages can also present hazards to drivers and pedestrians as vehicles pull out of parking spaces, pedestrians walk behind or in front of moving cars, and drivers exceed safe driving speeds within the garage.

SUMMARY

Exemplary embodiments of the present disclosure may address at least some of the above-noted problems. For example, according to first aspects of the disclosure, systems and methods may be provided that allow users to search for and select nearby available parking spaces using a graphical user interface, and automatically park the car in a selected parking space and/or garage.

According to further aspects of the disclosure, methods of automatically parking a vehicle may include one or more of receiving a request from a user to park a vehicle, the request including location information; searching a database including parking availability information based at least in part on the request and location information; determining an available parking space based on said searching; sending information related to the available parking space to the user; receiving confirmation from the user that the vehicle is to be in the available parking space; changing a status of the available parking space to and/or sending guidance information related to the available space to the user.

In embodiments, the location information may include GPS coordinates, and/or the search may return results within a predetermined distance of the GPS coordinates.

In embodiments, the search may return a plurality of available parking spaces, and the confirmation may include selection of one of the available parking spaces. In embodiments, the search may return available parking spaces in a plurality of parking structures, and the confirmation may include selection of one of the parking structures.

In embodiments, the guidance information may include at least one of coordinates associated with the available parking space, directions associated with the available parking space, communication link information for a local auto-guidance system associated with the available parking space, sensor and/or beacon identification associated with the available parking space.

Embodiments may also include automatically guiding the vehicle at least partly to the available parking space.

In embodiments, sending information related to the available parking space may include sending at least one of parking space location information, parking facility information, price information, distance information, and/or availability timing information.

Embodiments may also include charging the user a parking fee based at least in part on determining that the vehicle has arrived at the available parking space, determining that the vehicle has left the available parking space, and/or the confirmation from the user that the vehicle is to be parked in the available parking space.

According to further aspects of the disclosure, automatic parking systems may include one or more of a positioning system configured to determine the location of a vehicle; communication interface configured to receive available parking space information and guidance information; a user interface configured to allow a user to select at least one of an available parking garage or available parking spot; and/or a guidance system configured to drive the vehicle to a parking garage or parking spot selected via the user interface.

In embodiments, the communication system may be further configured to transmit a parking request including location information of the vehicle.

In embodiments, the guidance system may include one or more of a movement sensor, a plurality of cameras, and/or a sensor configured to detect at least one of sound waves, radio waves, or non-visible light waves.

In embodiments, the guidance system may be configured to operate in at least a first mode, e.g. for road driving, and a second mode, e.g. for driving in a parking structure and/or parking the vehicle. In embodiments, the second mode may include interpreting a data category that is not used in the first mode.

In embodiments, the guidance system may be configured to drive the vehicle to the parking garage or parking spot after the user exits the vehicle.

According to further aspects of the disclosure, automatic parking systems may include one or more of a communication interface configured to receive a parking request from a user, the parking request including location information; a parking space availability module including an input for receiving information associated with parking spot availability, and a processor for identifying an available parking spot based at least in part on the location information and the information associated with parking spot availability. In embodiments, the system may be further configured to send information associated with the available parking spot to the user; receive a parking confirmation for a selected parking spot from the user; change a status of the selected parking spot to unavailable; and/or send guidance information for automatically driving a vehicle at least partly to the selected parking spot.

In embodiments, the information associated with parking spot availability may include at least one of images, sound waves, radio waves, and/or non-visible light waves that indicate the presence or absence of a vehicle in a parking space.

In embodiments, the system may be configured to send information associated with a plurality of available parking spaces or structures, and to receive a selection of one of the available parking spaces or structures from the user.

In embodiments, the guidance information may allow the vehicle to be automatically driven in a first mode to a predetermined location in proximity to the selected parking spot. In embodiments, the system may be further configured to support a second driving mode for terminal guidance of the vehicle into the parking spot. In embodiments, the second driving mode may include recognition of predetermined guidance markers or signals associated with the available parking spot. In embodiments, the first driving mode may direct the vehicle to a parking garage entrance, and the second driving mode may navigate the vehicle within the parking garage to the selected parking spot.

In some embodiments, wireless charging of a vehicle is facilitated. The wireless charging may be facilitated after the vehicle is automatically parked in accordance with the disclosure. In some examples, a parking spot in accordance with the disclosure may be embedded with a pad on the ground, and the vehicle may include a receiver. In those examples, the pad embedded in the parking lot and the receiver in or on the vehicle may each include a coil of wire that can create a magnetic field, which can allow electric currents to be transferred between the two coils without physical connection. In some examples, the receiver in or on the vehicle may not need to be very close to the pad. In one example, a gap between the receiver and the pad can be up to 10 inches. In some embodiments, the parking spot may be automatically energized to charge a parked vehicle in accordance with an instruction transmitted to a control device associated with the parking spot.

In some embodiments, the automatic parking system in accordance with the disclosure may be configured to receive a request from the user to automatically park the vehicle and to charge the vehicle after the vehicle is automatically parked. In those embodiments, the automatic parking system may be configured to locate a parking spot available and suitable for parking and charging the vehicle. In those embodiments, after locating such a parking spot, the automatic parking system may be configured to generate an instruction to instruct the parking spot and/or the vehicle to be ready for the charging once the vehicle is parked in the parking spot.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings:

FIGS. 6A-6D depict a vehicle being parked by an automated vehicle parking system, according to another exemplary embodiment of the present disclosure.

DETAILED DESCRIPTION

Figure 1:
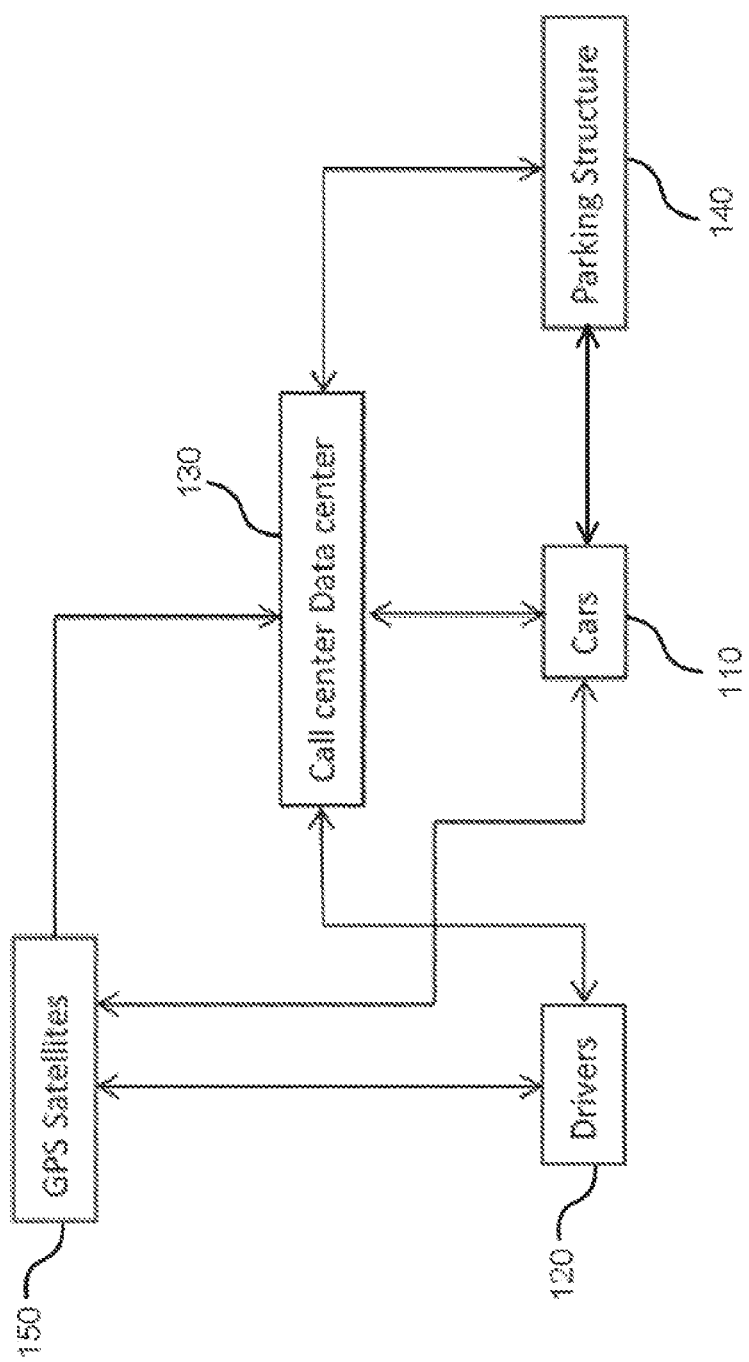
FIG. 1 is a schematic diagram of various elements that may be used in an automated vehicle parking system, according to an exemplary embodiment of the present disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for purpose of convenience of explanation and are determined based on the exemplary shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

FIG. 1 is a schematic diagram of various elements that may be used in an automated vehicle parking system, according to an exemplary embodiment of the present disclosure. As shown in FIG. 1, one or more cars 110 may be associated with drivers 120, e.g. via Bluetooth or other connection between a portable computing device of the drivers 120 with navigation, entertainment and/or control systems of their respective cars 110. The drivers 120 and/or cars 110 may be in communication with a call center/data center 130, which operates as a hub for processing requests for automated parking in certain embodiments.

Call center/data center 130 may include a communication interface, e.g. cellular, Internet, or other network connection that is configured to exchange information with drivers 120, cars 110, parking structures 140, GPS satellites 150, and/or any other navigation or location detecting system. Call center/data center 130 may include one or more computer servers with associated CPUs, input/output devices, memory and storage. Various applications, such as an automated parking program discussed herein, may be provided via a server interface running in memory and accessing various content in memory. In various embodiments, call center/data center 130 may be a computer system or other system owned or operated by a service provider, a municipality, an airport, a parking garage, etc. In some cases, the call center/data center 130 may interact with various municipal and/or commercial entities (generally represented by parking structure 140) to determine available parking options for a user in a given area, and can coordinate necessary information exchange, reserve parking spaces, guide the vehicle to the reserved spot, initiate parking fee payments, confirm that a vehicle has parked in the reserved spot, etc.

Those skilled in the art will appreciate that computing systems associated with drivers 120 (e.g. smart phones, tablet computers, vehicle controllers, etc.), cars 110 (e.g. entertainment, navigation, and/or control systems) and call center/data center 130 (e.g. computer servers, storage, databases, etc.) are merely illustrative and are not intended to limit the scope of the present subject matter. Such computing system may be connected to other devices that are not illustrated, including through one or more networks such as the Internet or via the web. More generally, a "computing device" may comprise any combination of hardware or software that can interact in the indicated manners, including computers, network devices, internet appliances, PDAs, wireless phones, pagers, electronic organizers, and various other consumer products that include inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available.

The call center/data center 130 may be configured to receive a parking request from a user such as driver 120 or via car 110. The parking request may include location information for the driver 120 or car 110, which may be calculated on GPS signal information received from GPS satellites 150, or in any other manner known in the art, such as triangulation, near-field communications, etc.

The call center/data center 130 may include an application, hardware and/or software module that is configured to determine parking space availability based on input from parking structures 140, or other information sources such as municipal cameras, and other sensor data. The received information can be associated with, or used to determine, parking spot availability in various ways. For example, image data from cameras can be compared to reference images to determine whether a vehicle is in one or more parking spaces, radio, sound and/or non-visible light may be used to determine if an object (i.e. a vehicle) is in a parking spot, weight sensors may detect a weight in excess of a threshold indicating the presence of a vehicle, etc.

The call center/data center 130 may include one or more processors and/or software instructions that identify an available parking spot based at least in part on location information associated with a parking request (e.g. the location of a requesting cell phone, vehicle navigation system, etc.) and information associated with specific parking spot availability, such as location information for one or more parking structures and information that indicates, directly or indirectly, that a given parking space is vacant. In embodiments, the information associated with parking spot availability may include at least one of images, sound waves, radio waves, and/or non-visible light waves that indicate the presence or absence of a vehicle in a parking space.

In some examples, a parking structure may determine independently that certain parking spaces are available, and send identifying information to the call center/data center 130, on a routine or triggered basis, or in response to a specific request that may be generated for a given parking request. For example, the call center/data center 130 may maintain an ongoing record of available parking spaces based on periodic and/or triggered updates from of the parking structures, allowing for rapid determinations of parking space availability, or call center/data center 130 may determine an appropriate area based on a given request, and query any structures within a predetermined distance of the requesting user's location. The call center/data center 130 may also analyze raw data, e.g. video or other sensor feeds to independently determine parking space availability in a certain area.

In embodiments, the call center/data center 130 may be further configured to send information associated with the available parking spaces to the requesting user. This can be done via various communication protocols, e.g. via an application running on a user device and/or vehicle system, and can include various data, such as location information, price information, distance information, hours of operation, and any other information about a parking spot/structure that the user may find helpful in deciding where to park.

In embodiments, the user and/or vehicle device may display parking options for the user based on the information associated with the available parking spaces received from the call center/data center 130. This can include, for example, a map with available parking spaces and/or structures, a map with available parking structures, a list of available parking spaces sorted by distance, price or other factors, etc.

In embodiments, the call center/data center 130 may be further configured to receive a parking confirmation for a selected parking spot from the driver 120 and/or car 110. This may be based on the user's selection of a given parking spot and/or structure via the interface on the user and/or vehicle device. The call center/data center 130 may also change a status of the selected parking spot to unavailable, which may include setting a flag or otherwise changing a data field in their own database, and/or communicating such information to a parking structure 140. In some examples, the parking spot "reservation" may be limited in time such that, if the vehicle does not occupy the parking space after a given period of time, the reservation is removed, and any instructions operable to guide the vehicle to the space are canceled or interrupted.

In embodiments, the call center/data center 130 may be further configured to send guidance information for automatically driving a vehicle at least partly to the selected parking spot. This may include, for example, sending GPS coordinates that the auto-navigation of the vehicle may use to drive to a parking structure entrance in a first mode that uses a first set of sensors and processing to navigate on identified roads. It should be appreciated that this information may be sent to the requesting user's personal device, and downloaded by the user onto a vehicle navigation system. This information can also include cryptographic or other keys that the system provides to the requesting user, that can be transferred to, and used by, vehicle to authenticate with local systems in parking structure 140.

It should be appreciated that the various requests, analyses, and responses described above can be distributed among the components depicted in FIG. 1 in myriad ways, without departing form the scope of the disclosure. For example, as smartphones and/or vehicle control systems achieve in greater computing and communication power, various of the functions described as taking place at the call center/data center 130 may be offloaded to client devices, which may then interact directly with local systems such as individual smart parking meters, etc.

Figure 2:
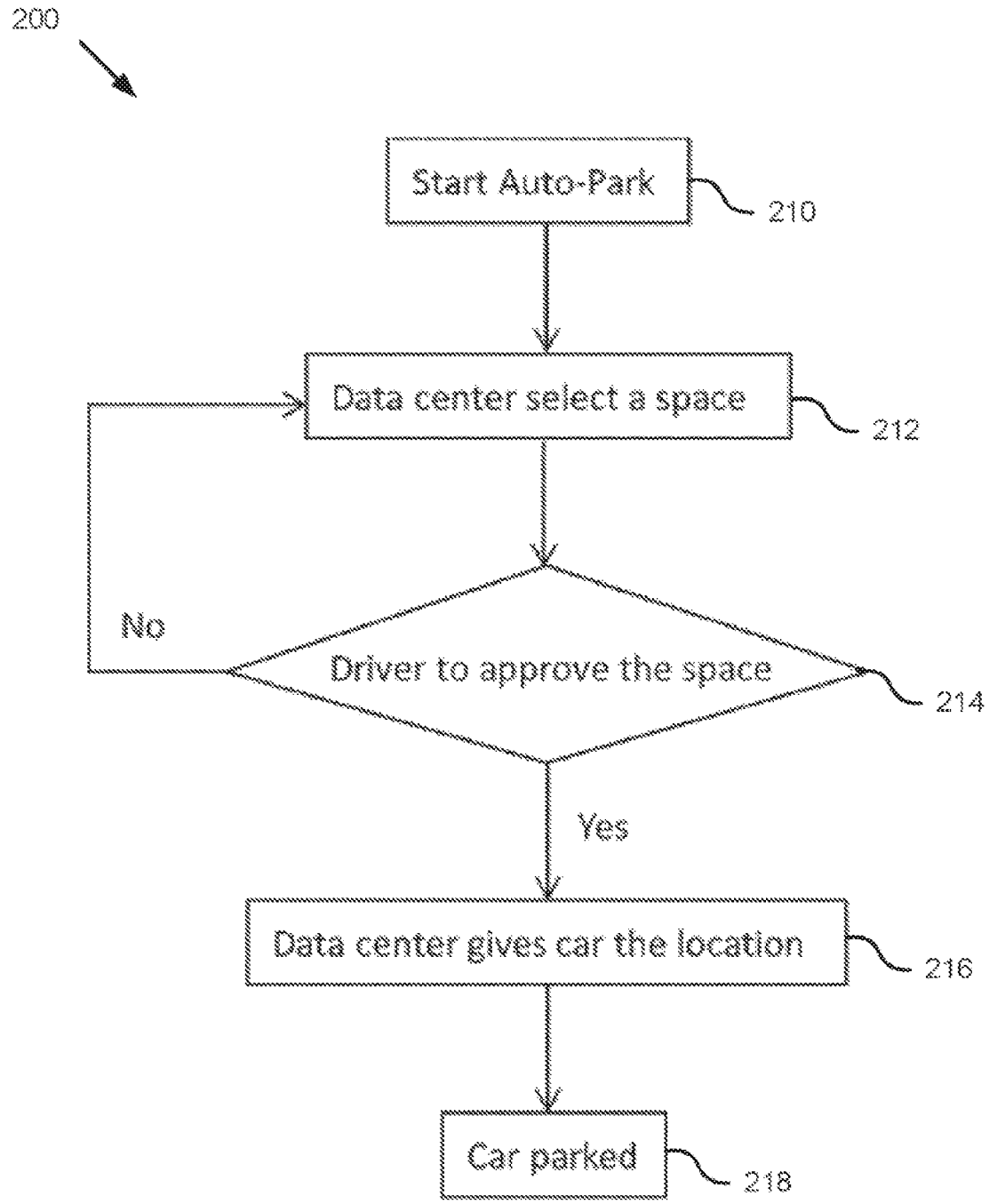
FIG. 2 is a process flow depicting aspects of an automated vehicle parking method, according to another exemplary embodiment of the present disclosure.
Figure 3:
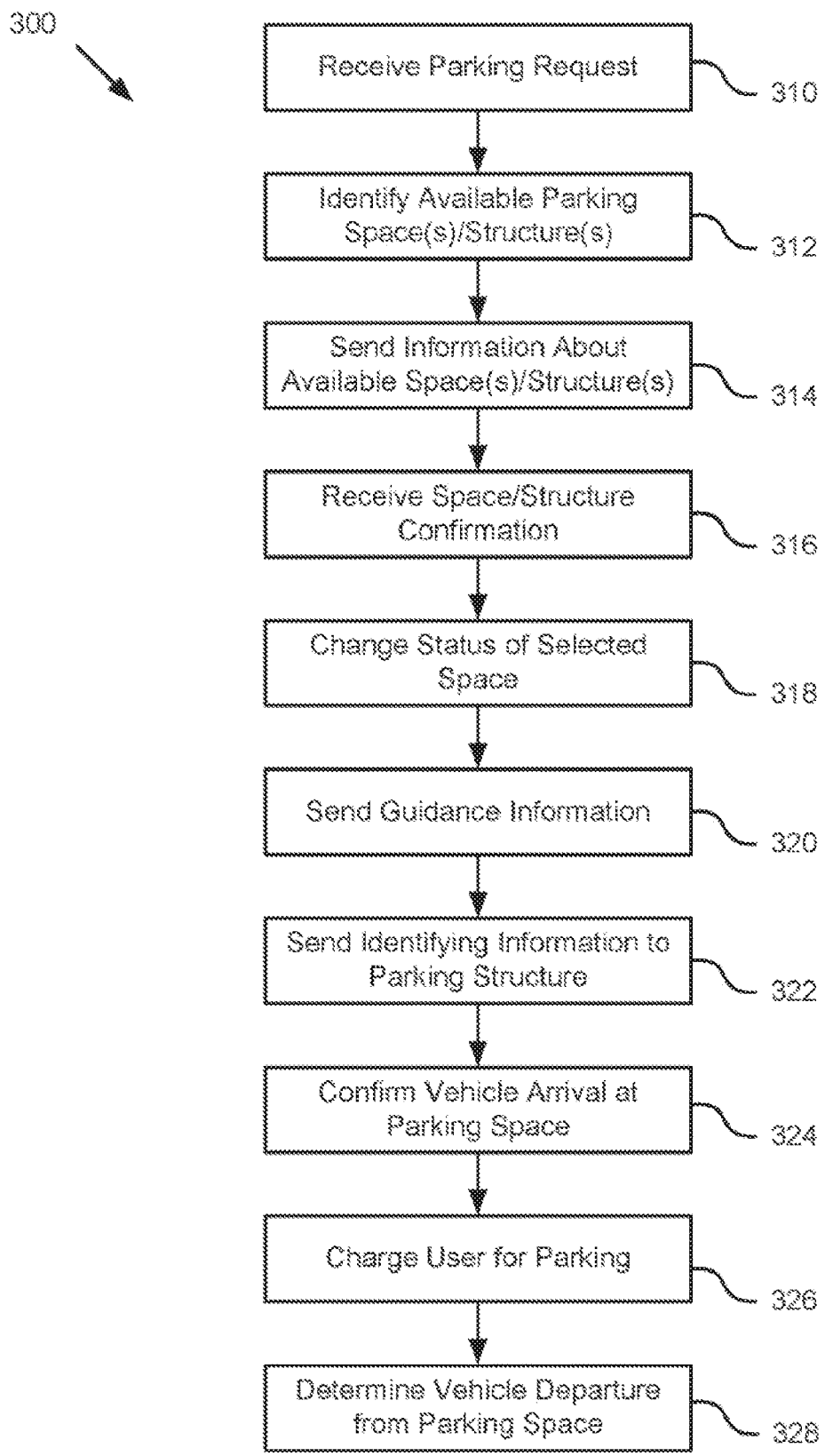
FIG. 3 is another process flow depicting aspects of an automated vehicle parking method from the perspective of a control server, according to another exemplary embodiment of the present disclosure.
Figure 4:
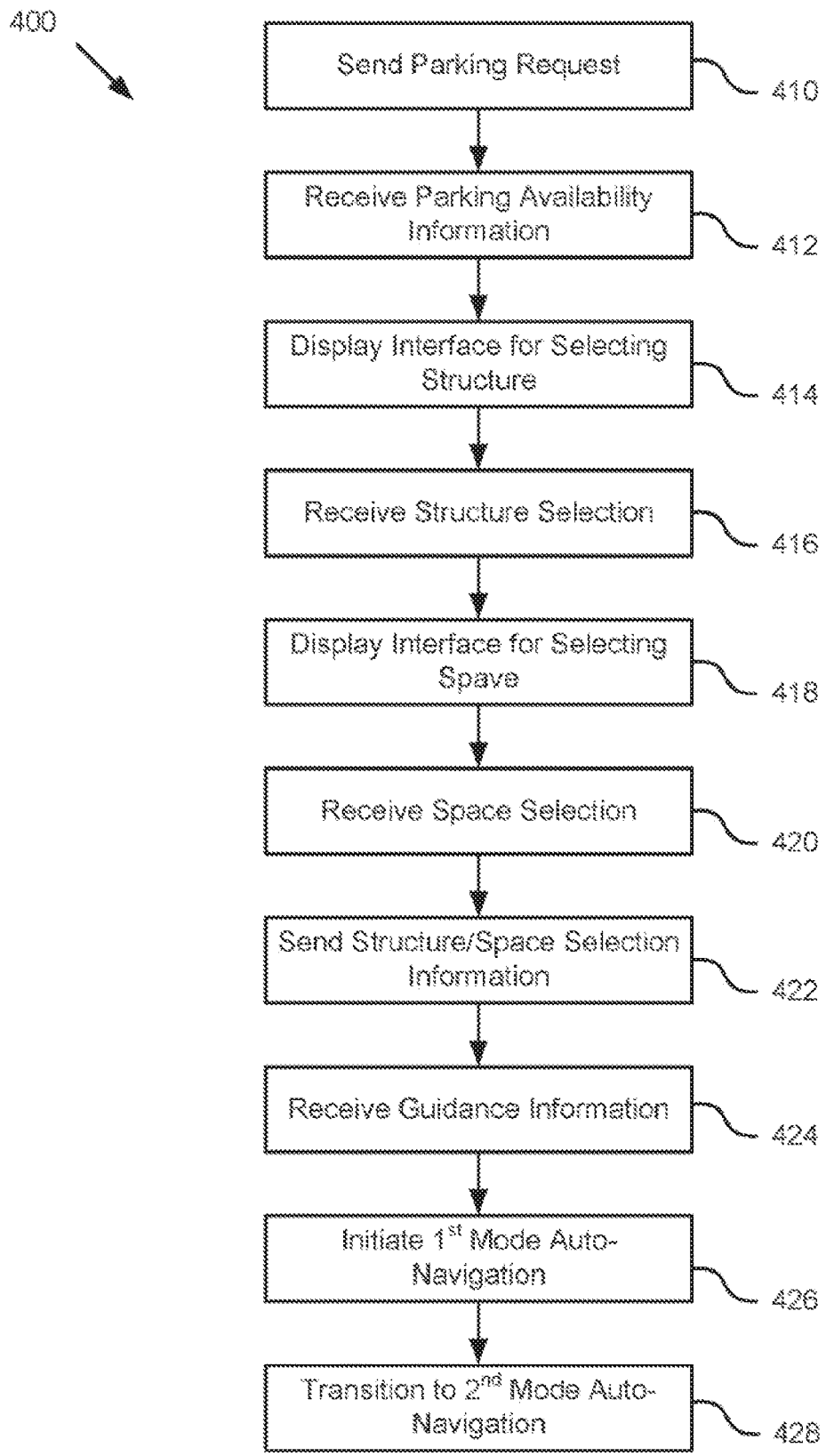
FIG. 4 is another process flow depicting aspects of an automated vehicle parking method from the perspective of a user device and/or vehicular system, according to another exemplary embodiment of the present disclosure.

FIGS. 2-4 depict various process flows according to aspects of automated vehicle parking methods of the present disclosure. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

FIG. 2 is a process flow depicting aspects of an automated vehicle parking method, according to another exemplary embodiment of the present disclosure. As shown in FIG. 2, process flow 200 may begin with a user initiating an auto-park process in 210. This can include, for example, activating an application on a personal computing device, activating a parking system incorporated in a vehicle, or even using an auto-park function included in a vehicle key or other control device. In some examples, 210 may include sending the request to a data center, such as call center/data center 130 shown in FIG. 1. The request may a user and/or vehicle identifier, and location information for the user and/or vehicle. In some examples, user preferences may be embedded in the parking request and/or may be stored by the call center/data center 130 in a user preference file, or the like. Such preferences may include, for example, security requirements, blacklisted parking structures and/or areas, price limits, or any other preferences that the user finds helpful in pre-screening parking options.

The flow may continue with 212, in which the data center determines any spaces that are available, e.g. based on the user's location and any other relevant parameters, and sends information related to the available spots/structures to the requesting user. This can include, for example, location information, price information, distance information, hours of operation, image/video information, and any other information about a parking spot/structure that the user may find helpful in deciding where to park. This information may be interpreted by the application running on the client device, and presented to the user in various ways, such as maps, sorted lists, etc.

The flow may continue with decision point 214, in which a determination is made regarding whether the user has approved (e.g. selected) a given parking space and/or structure. In some cases, a user may only be presented with a list/map of available structures, without requiring the user to select a particular spot in that structure. In such cases, the system may automatically assign a spot within a selected structure. In other cases, the user may be given an interface that allows them to select specific parking spaces, which may include image and/or map data for one or more available spots.

If 214 indicates that no approval has been received, the flow may return to 212 and the system can wait for a response, suggest other possible alternatives and/or update the parking space availability based on new availability information received. As such, users can be given a virtually real-time view of parking spaces that become available in a given area, and can reserve such spaces for automatic parking as they become available.

If 214 indicates that an approval has been received, the flow may continue with 216, in which the data center provides the requesting user and/or associated vehicle with location information for the selected parking space/structure. This may include various combinations of data, from basic GPS coordinates, to detailed route and parking instructions. For example, in cases where the onboard navigation system of the vehicle is configured to direct the vehicle to a GPS coordinate, the information may be appropriately limited. However, in other cases, such as where the vehicle requires route information, or there is information specific to the parking space/structure that the navigation will need to park the vehicle, a more robust information package may be sent in 216.

The flow may continue with 218, in which the vehicle is automatically driven to, and parked in, the selected parking space. Successful completion of the automated parking process may be detected in various ways, such as cameras or other sensors in the parking space, GPS or other location calculations for the vehicle, and combinations thereof. As described further herein, successful completion of the automated parking process may also trigger various actions, such as sending the requesting user a confirmation message and/or photograph, charging the requesting user a parking fee, etc.

FIG. 3 is another process flow depicting aspects of an automated vehicle parking method from the perspective of a control server, according to another exemplary embodiment of the present disclosure. As shown in FIG. 3, process flow 300 may begin with a parking request being received, e.g. at the call center/data center 130. The request may include a user and/or vehicle identifier, and location information for the user and/or vehicle.

The flow may continue with 312, in which the data center determines any spaces and/or parking structures that are available, e.g. based on the user's location and any other relevant parameters.

The flow may continue with 314, in which the data center sends information related to the available spots/structures to the requesting user. This can include, for example, information, price information, distance information, hours of operation, image/video information, and any other information about a parking spot/structure that the user may find helpful in deciding where to park.

The flow may continue with 316, in which a confirmation for a selected space and/or parking structure are received.

The flow may continue with 318, in which the status of the selected parking space is changed to unavailable. This may be done locally by the data center, e.g. if they have exclusive control of the automated parking in a given structure, or the status information may be shared in substantially real-time with a parking garage or any other entity that may have access to the parking garage.

The flow may continue with 320, in which guidance information may be sent to the requesting user and/or associated vehicle. As described previously, such information may include various combinations of data, from basic GPS coordinates, to detailed route and parking instructions. In some examples, this may include information sufficient to navigate the vehicle to a particular spot in a multi-level parking structure, or it may be more limited, e.g. to guide the vehicle to a "hand-off" point, where a localized terminal navigation protocol is implemented.

In some examples, systems may be configured to analyze an actual picture of the parking space and surrounding, and to determine at least part of the guidance information based on the analysis, e.g. the route into the parking spot, the clearances on either side, etc.

The flow may continue with 322, in which information identifying the vehicle may be sent to the selected parking structure and/or parking navigation aid. This may be used, for example, when the selected parking space and/or structure has a localized terminal navigation system that will synchronize with the vehicle's auto-navigation system in order to park the vehicle. For example, the selected parking space and/or structure may have one or more sensors and/or beacons that can be turned on and/or adjusted to communicate with the vehicle when parking is imminent, e.g. by near-field communication, response to predetermined signaling, etc. In order to effectuate such processes, it may be beneficial for the parking structure and/or parking navigation aid to have identifying information for the vehicle. In some examples, this may include one or more of a network address associated with the a transmission code associated with the vehicle, a cryptographic or other key associated with the vehicle, etc.

The flow may continue with 324, in which successful completion of the automated parking process may be determined. This may be determined in various ways, such as using cameras or other sensors in the parking space, GPS or other location calculations for the vehicle, and combinations thereof. It should be noted that, in some examples, parking structures may control access such that only registered vehicles will be allowed to enter, thereby minimizing or eliminating the possibility of someone taking the selected parking space before the vehicle arrives. However, in some examples, e.g. in less controlled areas such as street or public pay parking, there is the possibility that the selected spot may be taken before the vehicle arrives. Therefore, systems and methods described herein may also provide for a rerouting function whereby the vehicle may be redirected enroute if the selected parking space is taken by someone else. This may be implemented in various ways including monitoring the location of the vehicle and the status of the selected parking space. If the status of the parking space changes to occupied, e.g. based on detecting another vehicle in the space, before the user's vehicle arrives at the parking spot and/or the parking structure, then the system may calculate a nearest available space and send new guidance information to the vehicle, as was done in 320. In some examples, the user may be sent an update alerting them to the change, or may be presented with a new selection interface to pick an alternate parking space. In some example, a "holding pattern" command may be sent to the vehicle, e.g. to have it loiter by driving a designated circle until new guidance information is communicated.

The flow may continue with 326, in which the user may be charged for the parking service. As mentioned above, the processes described in this and other flows included in the disclosure do not necessarily require every step, and do not require a specific order of completion. This is particularly true with respect to the point at which the user is charged for the parking service. In some examples, the individual vendor may set the point at which the user is charged, or the user may be charged when the parking reservation is confirmed, when the vehicle is parked in the parking space, and/or when the vehicle leaves the parking space.

The flow may continue with 328, in which the departure of the vehicle from the space is determined. This determination can be made based on similar factors to those used in determining the successful parking of the vehicle in the space, and can be used for various purposes such as calculating the total charge for the parking, changing a status of the parking space back to "available," etc.

FIG. 4 is another process flow depicting aspects of an automated vehicle parking method from the perspective of a user device and/or vehicular system, according to another exemplary embodiment of the present disclosure. As shown in FIG. 4, process flow 400 may begin with sending a parking request, e.g. from a user or vehicle device to the call center/data center 130. The request may include a user and/or vehicle identifier, and location information for the user and/or vehicle, which may be determined by GPS or any other automated location determining methodology.

The flow may continue with 412, in which information related to available spots/structures are received by the requesting user. This can include, for example, location information, price information, distance information, hours of operation, image/video information, and any other information about a parking spot/structure that the user may find helpful in deciding where to park.

Figure 8:
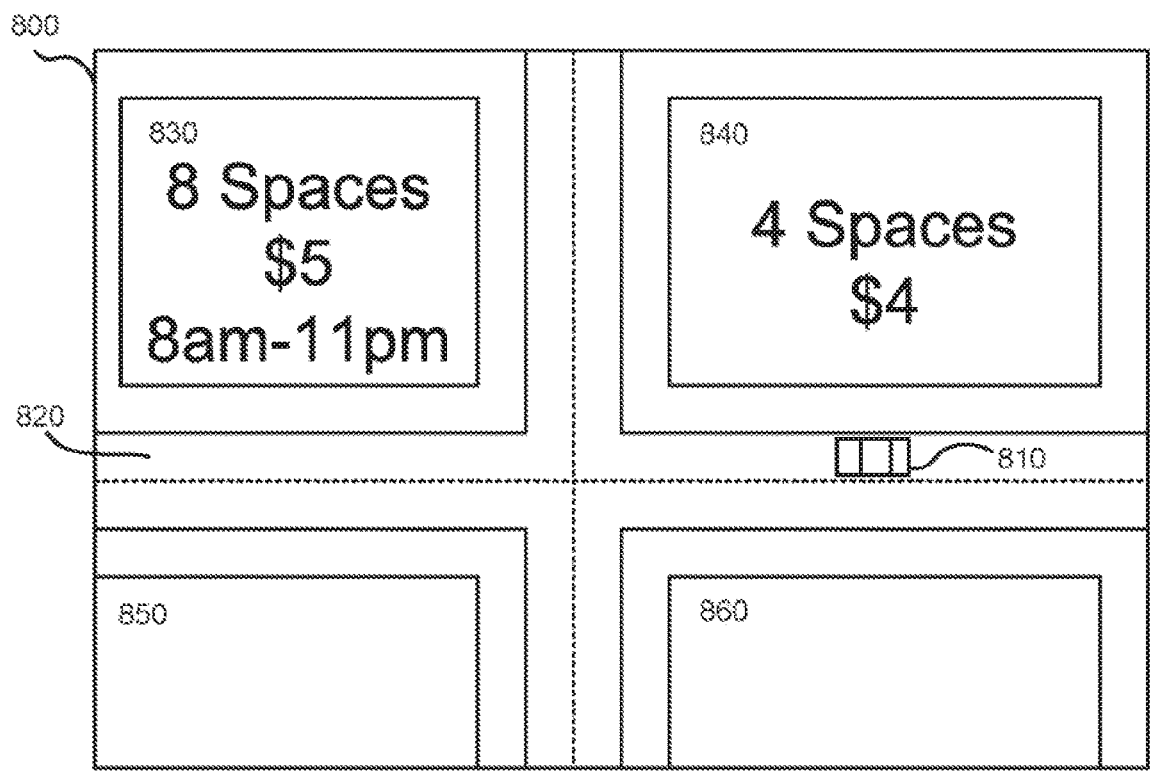
FIG. 8 is an exemplary graphical user interface for an automated vehicle parking system, showing available parking structures on a map, according to another exemplary embodiment of the present disclosure.

The flow may continue with 414, in which an interface is displayed for selecting the desired parking structure. This may include, for example, a map (such as shown in FIG. 8), a sorted list, or any other display conducive to allowing the user to view information about the parking structures and select a desired location. In some examples, the display may include one or more of parking facility information, price information, distance information, availability timing information, etc.

The flow may continue with 416, in which selection of a particular parking structure may be received. This may be accomplished in various ways, such as the user pressing a portion of a touch screen display corresponding to the parking structure, selection of a hard corresponding to the desired parking structure, voice commands identifying the parking structure, etc. In some examples, the user may simply be able to force a selection based on user preferences and/or voice commands for one or more specific criteria, such as "pick the least expensive garage within 1 mile" or "pick the closest garage." In cases where the user merely needs to select a parking facility, without picking a specific parking space, the flow simply skip 418-420, and proceed to sending the structure selection in 422. However, in cases the user may be allowed to select a specific parking space, which can be accomplished proceeding with 418.

Figure 9:
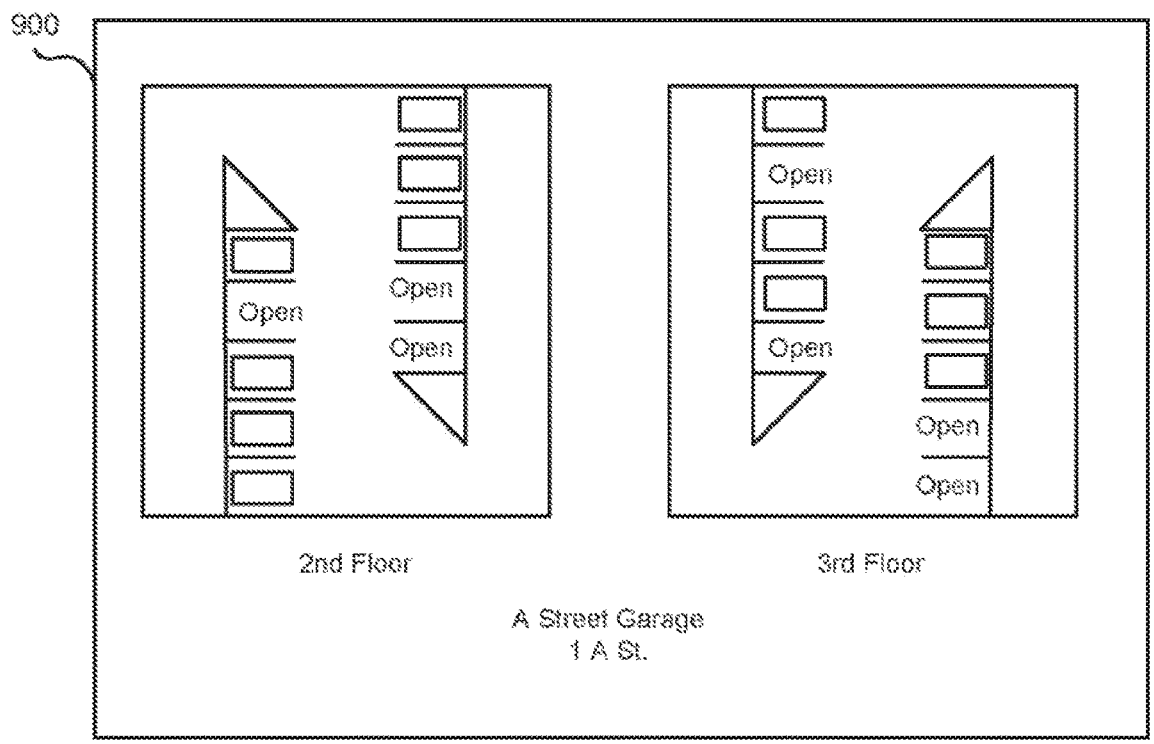
FIG. 9 is another exemplary graphical user interface for an automated vehicle parking system, showing available parking spaces on a map, according to another exemplary embodiment of the present disclosure.

In 418 an interface for selecting a specific space may be displayed (such as shown in FIG. 9). In some examples, the interface may include a street view, or a 3-dimensional representation of a multi-level parking structure, with available parking spaces highlighted. In some examples, the interface may include actual images captured from the parking space location, allowing the user to better understand the conditions of the parking spot. In some examples, the interface may include a sorted or unsorted list of available spaces with relevant information such as cost, distance, etc.

The flow may continue with 420, in which a confirmation for a selected space is received. This may be accomplished in various ways, such as the user pressing a portion of a touch screen display corresponding to the parking space, selection of a hard key corresponding to the desired parking space, voice commands identifying the parking space, etc. In some examples, the user may simply be able to force a selection based on user preferences and/or voice commands for one or more specific criteria, such as "pick the least expensive space within 1 mile" or "pick the closest space."

The flow may continue with 422, in which the structure and/or space selection may be sent, e.g. to the call center/data center 130.

The flow may continue with 422, in which guidance information may be received by the requesting user and/or associated vehicle. As described previously, such information may include various combinations of data, from basic GPS coordinates, to detailed route and parking instructions. In some examples, this may include information sufficient to navigate the vehicle to a particular spot in a multi-level parking structure, or it may be more limited, e.g. to guide the vehicle to a "hand-off" point, where a localized terminal navigation protocol is implemented.

The flow may continue with 426, in which a first mode of auto-navigation is initiated by the vehicle. In some examples, the vehicle user may set one or more parameters that allow initiation of the auto-navigation. For example, the user may be required to confirm initiation via an application on their smart phone or other control device, like a vehicle key. Automated cues may also be used, such as starting the auto-navigation after all occupants exit the vehicle, etc. In some examples, the first auto-navigation mode may use a first set of sensors to navigate the vehicle via known roadways to a position in proximity to the selected parking space/structure. These may include, for example, GPS, proximity sensors, cameras or other sensors used for autonomous vehicle driving.

The flow may continue with 428, in which a second mode of auto-navigation is initiated by the vehicle. In some examples, the parameters that cause initiation of the second mode of auto-navigation may be included in the guidance information or other information received by the vehicle when it arrives at a location in proximity to the selected parking space/structure. For example, a parking garage system may authenticate the vehicle when it arrives at the garage entrance and communicate terminal guidance information for navigating to the selected parking space to the vehicle. In some examples, the second auto-navigation mode may use a second set of sensors, or different sensor criteria, to navigate the vehicle that are different than those of the first auto-navigation mode. For example, radio receivers may be tuned to a specific radio beacon associated with the selected parking space, camera sensing may be tuned to specific line colors used in the garage, non-visible light sensors may be tuned to particular blink patterns and/or frequencies, etc. In some examples, the second mode of auto-navigation may be used to park the vehicle in a specific parking space.

Figure 5:
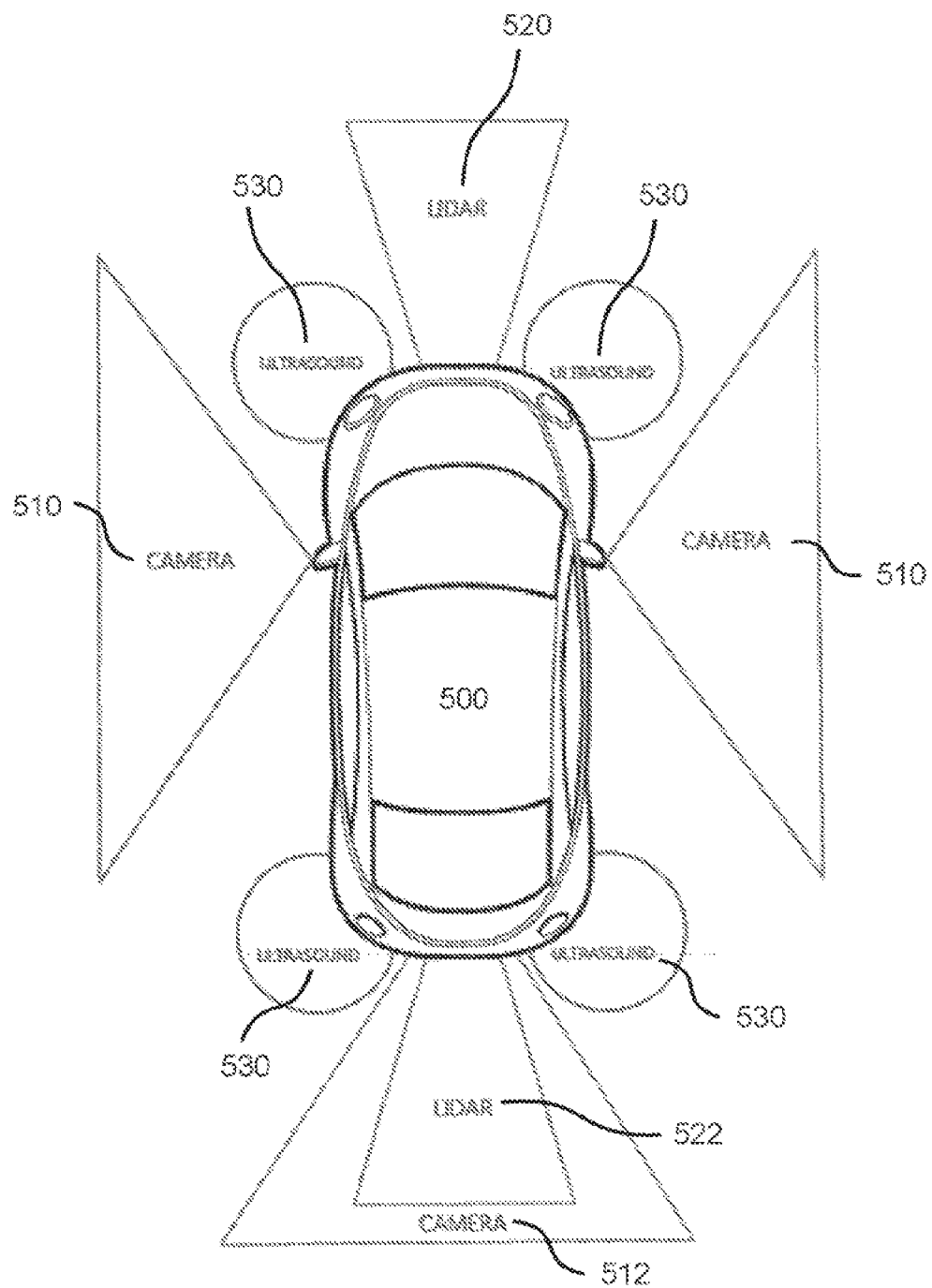
FIG. 5 is a diagram of a vehicle including various sensor elements that may be used in an automated vehicle parking system, according to another exemplary embodiment of the present disclosure.

FIG. 5 is a diagram of a vehicle including various sensor elements that may be used in an automated vehicle parking system, according to another exemplary embodiment of the present disclosure. As shown in FIG. 5, a vehicle 500 may include a plurality of sensor, transmitter and/or transceiver types including cameras 510, 512, proximity sensors such as LIDAR transceivers 520, 522 and/or ultrasound transceivers 530. The vehicle 500 may also include any manner of network transceiver, and/or transmitter (not shown), e.g. for communicating with user devices and/or identifying the vehicle to automated parking described herein. Any of the sensors shown in FIG. 5 may be communicatively coupled to a processor of an automated parking/navigation system included in the vehicle 500. Such communications may serve multiple purposes, such as providing driver-assist functions, proximity alarms, back-up camera view, etc. when a driver is operating the vehicle 500, and assisting with the automated navigation and parking of the vehicle when it is being driven by the auto-navigation system. As also shown in FIG. 5, each of the sensor/transceiver units typically have an effective range (distance and/or angle).

Figure 6A:
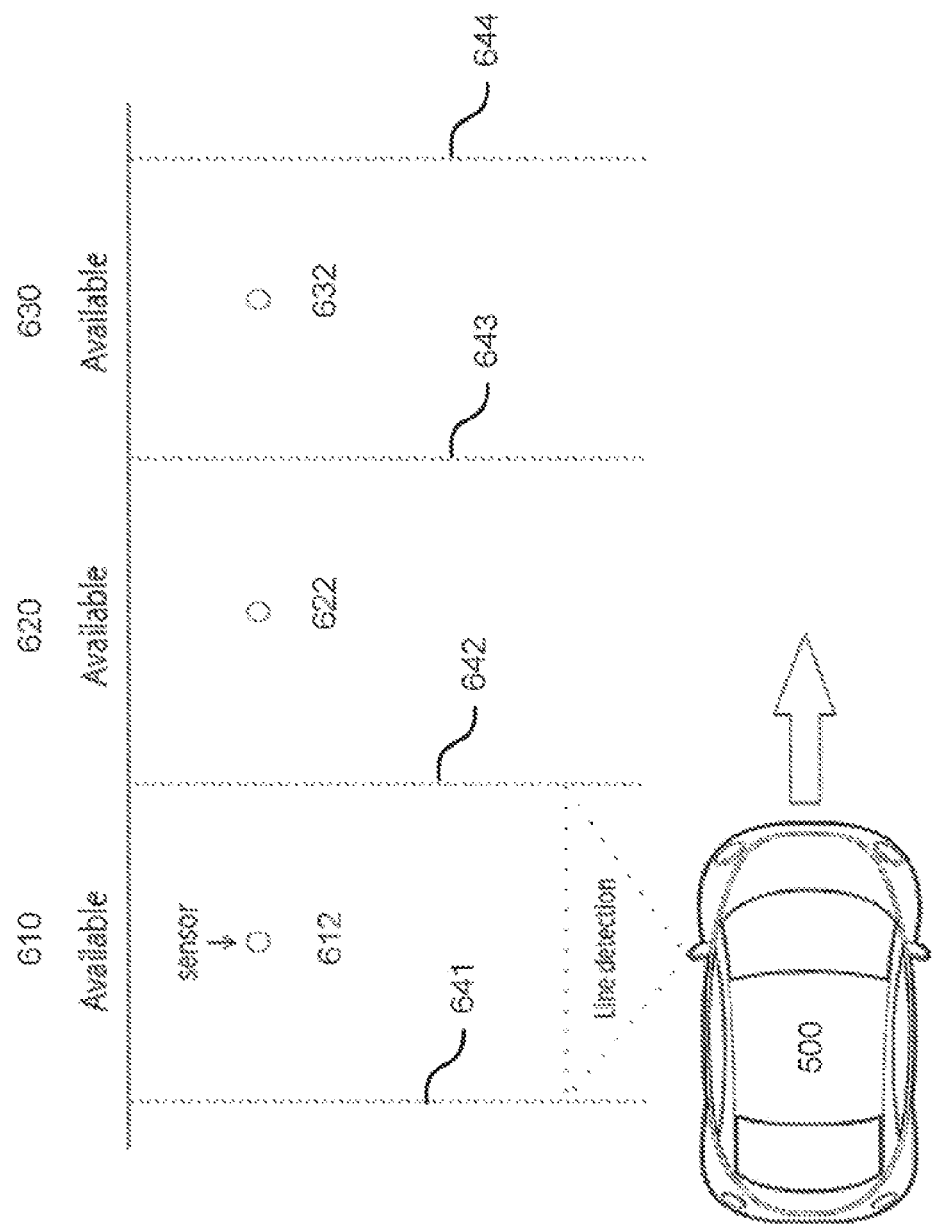

FIGS. 6A-6D depict a vehicle being parked by an automated vehicle parking system, according to another exemplary embodiment of the present disclosure. As shown in FIG. 6A, the vehicle 500 may be approaching a selected parking space 610. The spaces 610, 620, 630 may be located on a street, or in a multilevel parking garage. Spaces 610, 620, 630 may be defined by lines 641-644, which may be visible painted lines, visible and/or invisible light lines, or any other detectable line. Each of spaces 610, 620, 630 also has one or more corresponding sensors 612, 622, 632, which may be used by the automated parking system to assist vehicle 500 with locating and parking in the selected parking space.

In some examples, the vehicle 500 may be guided to a position proximate to parking space 610 in a first navigation mode, e.g. based on GPS and other navigation data. As shown in FIG. 6A, as the vehicle 500 approaches parking space 610, it may transition to a second navigation mode and use, for example, cameras, like 510 shown in FIG. 5, to detect lines 641, 642 or other visible indicia. The parking structure may also use any of sensors 612, 622, 632 to identify the vehicle 500 and/or confirm the vehicle's location within the parking structure. For example, the sensor 612 may detect an identifiable feature of vehicle 500 as it passes by, or may use various near-field interrogation techniques to identify vehicle 500. In some examples, the vehicle 500 may communicate with a terminal navigation system in order to park the vehicle in the selected space. For example, when the vehicle 500 is detected in the position shown in FIG. 6A, the terminal navigation system may communicate specific instructions for the vehicle 500 to execute, including sensor data, etc. In other examples, the system onboard the vehicle 500 may be more autonomous, and may be configured to execute the necessary parking maneuvers without specific guidance from a terminal navigation system.

Figure 6B:
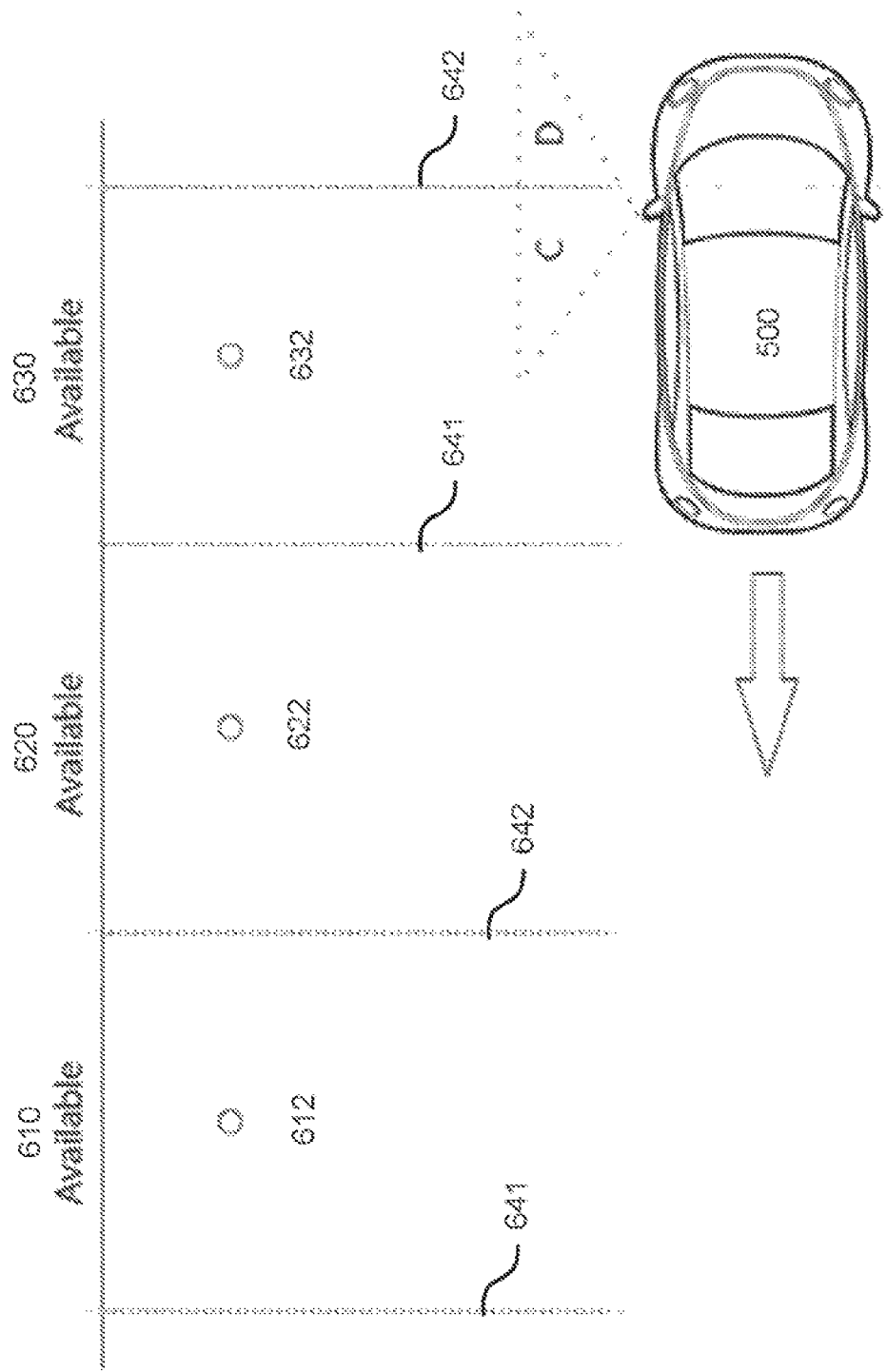

The vehicle 500 may pass the lines 641, 642 and transition to another position shown in FIG. 6B. As shown in FIG. 6B, the vehicle 500 reaches a point at which the automatic parking system determines a backing movement should begin. This may be based, for example, on passing additional line 641 and/or locating the vehicle 500 with respect to a specific line 642, e.g. via camera imaging and/or other sensing techniques. In some vehicle position information, particularly in close maneuvering may be established using redundant sensors, such as multiple cameras, GPS and camera or other sensor data, near-field locating, LIDAR, etc.

Figure 6C:
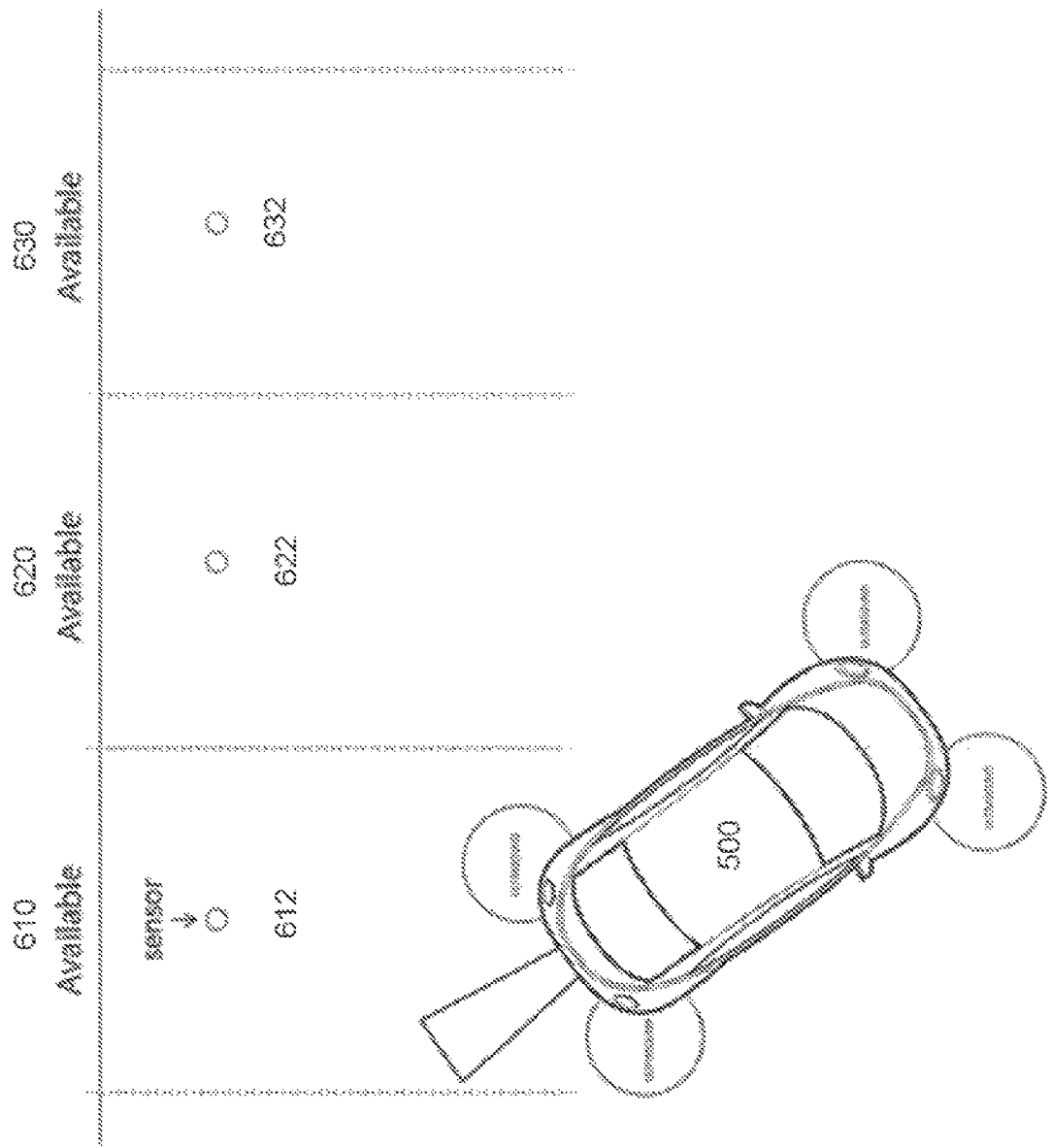

The vehicle 500 may continue backing up and transition to another position shown in FIG. 6C. As shown in FIG. 6C, the vehicle 500 begins turning into space 610 and actively monitors proximity detectors, such as ultrasound transceivers 530 and/or LIDAR 522, and may also use a camera, like 512, to assist with the final positioning of the vehicle 500 in the space 610. This may be based, for example, on monitoring movement of the vehicle 500, monitoring relative changes in the lines 641, 642, information exchanged with sensor 612, etc. In some examples, the ultrasound transceivers 530 (or similar sensors) may be used to ensure that, even though the vehicle is in the right location, there are not unexpected obstacles that impede the parking maneuver.

The vehicle 500 may continue backing up and transition to another position shown in FIG. 6D, in which the parking maneuver is completed. As shown in FIG. 6D, the vehicle 500 reaches a position in space 610 in which various sensors are used to confirm its proper alignment. For example, cameras 510 may compare relative angles of the lines 641, 642, LIDAR 522 may detect proximity to a back wall of the space, ultrasound detectors 530 may ensure that the vehicle has the proper standoff from any adjacent vehicles or objects, etc. In some examples, the status of the space 610 may be changed to unavailable once the requisite confirmation is complete (if not done so already).

Figure 7:
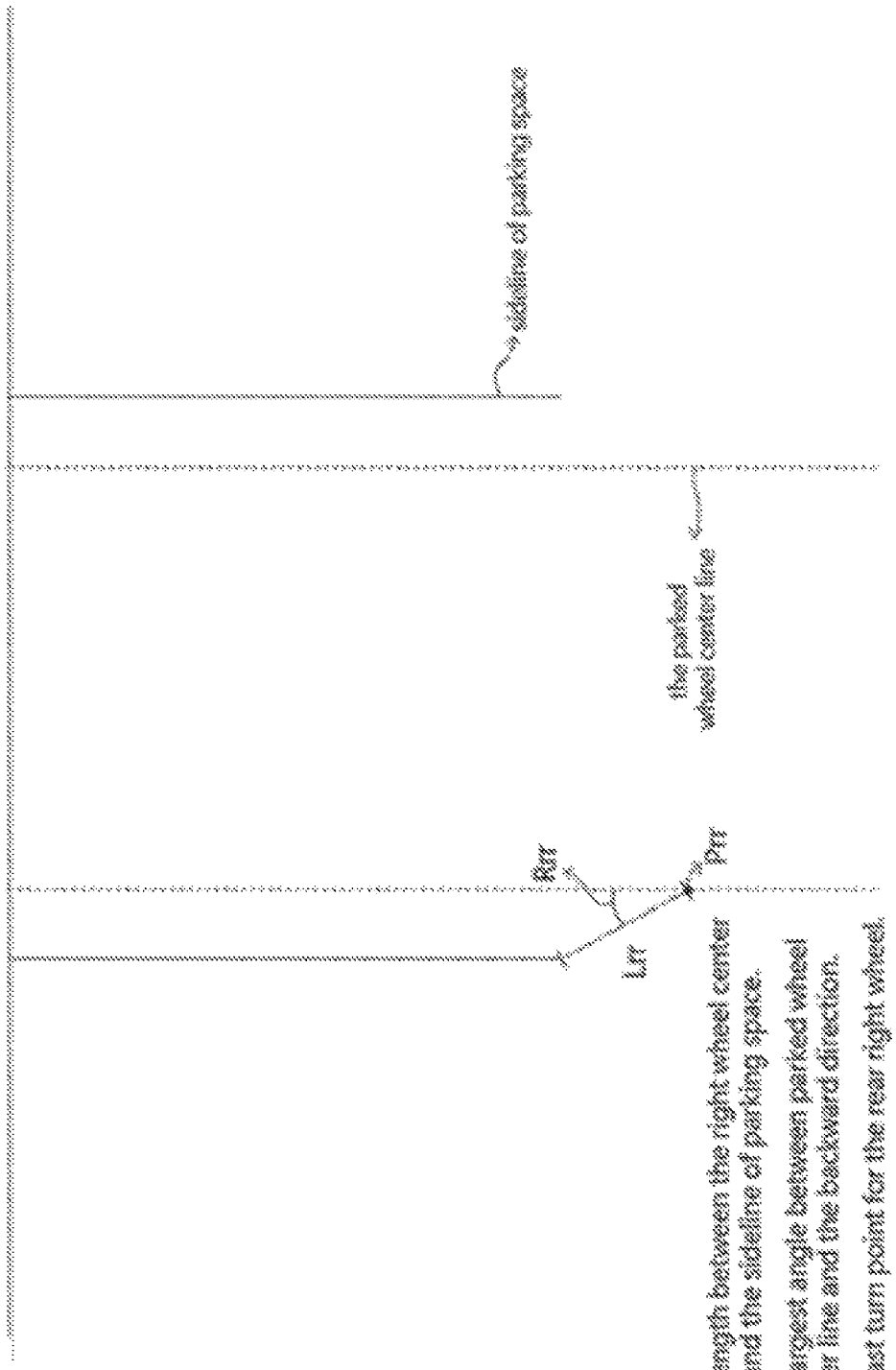
FIG. 7 is a diagram showing exemplary control conditions that may be used by an automated vehicle parking system, according to another exemplary embodiment of the present disclosure.
Figure 10A:
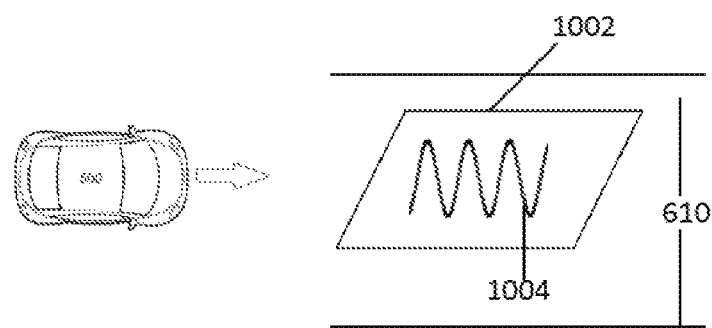
FIG. 10A illustrates an example of a park spot configured to facilitate wireless charging a vehicle in accordance with the disclosure.

FIG. 7 is a diagram showing exemplary control conditions that may be used by an automated vehicle parking system, for a backing maneuvers as shown in FIGS. 6A-6D. As shown in FIG. 7, algorithms for terminal guidance into a parking space may be based, for example, on the position of the desired parked wheel center line, the sidelines of the parking space, and the length between the right wheel center line and the sideline of the parking space (Lrr), and may be used to determine (among other criteria) the largest angle between the wheel center line and the backward direction (Rrr), and the last turn point for the right rear wheel In some embodiments, wireless charging of a vehicle through the automatic parking system may be facilitated. Generally, wireless charging of the vehicle may be facilitated through a parking space equipped with such capacity. After the vehicle is automatically parked in the park space in accordance with the disclosure, the wireless charging function of the parking space may be activated to charge the vehicle. In some embodiments, the parking space may be embedded with a pad that comprises a coil of wire. FIG. 10A illustrates such a park space. As shown, the parking space 610 may be equipped with a pad 1002 embedded on the ground of the parking space. The pad 1002 may comprise a coil of wire 1004. The vehicle 500 in those embodiments may include a receiver (not shown). The receiver may be mounted on an exterior of the vehicle (e.g., chassis) or within the vehicle (e.g., inside the body of the vehicle). The receiver may be operatively connected to a battery system of the vehicle and may include a coil of wire. The coil of the receiver and the coil 1004 of the pad 1002 may together create a magnetic field when both coils are activated such that the electric current passing through coil 1004 can be transferred to the coil in the receiver and thus charge the vehicle 500 wireless when it is parked in the parking space 610. In some embodiments, there can be a gap between the receiver and the pad 1002 for the charging to be activated. That is, the receiver does not necessarily have to contact the pad. In one embodiment, such a gap can be up to 10 inches.

Figure 10B:
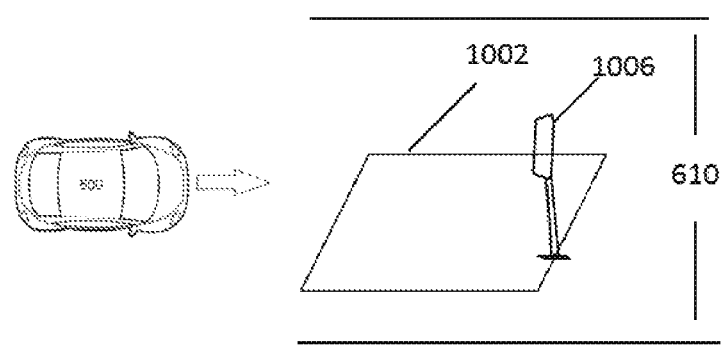
FIG. 10B illustrates another example of a parking sport configured to facilitate wireless charging a vehicle in accordance with the disclosure.

It should be understood the configuration of the parking space 610 for the wireless charging as shown in FIG. 10A is not necessarily the only case. Other configurations are contemplated. For example, as shown in FIG. 10B, the parking space 610 may be equipped with a charging pole 1006 that is connected to the pad 1002. In that example, wires inside the charging pole may create a magnetic field with the receiver in or on the vehicle 500 to charge the vehicle 500 after it is parked inside the parking space.

Figure 11:
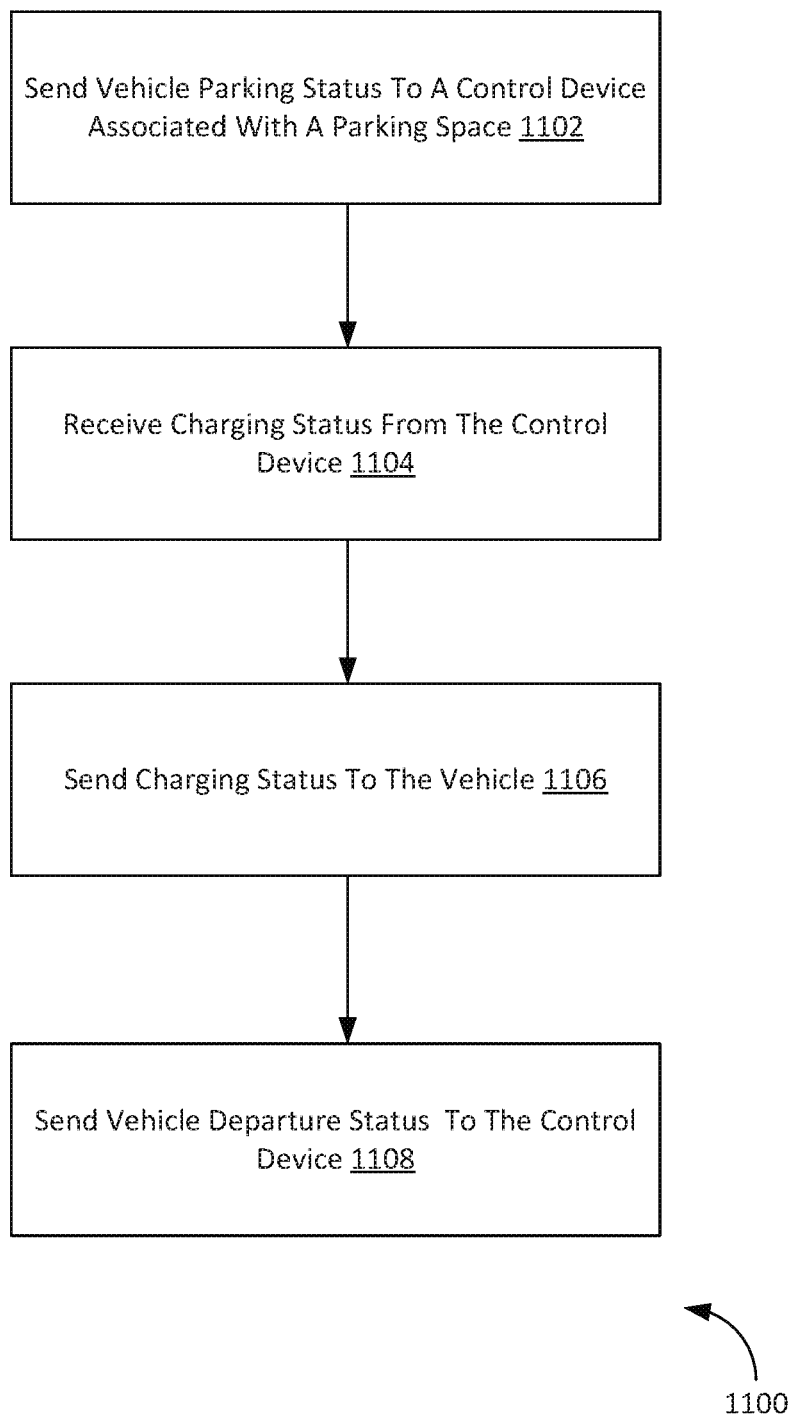
FIG. 11 illustrates an exemplary method for facilitating wireless charging a vehicle in accordance with the disclosure.

Having described general infrastructure of a parking space that can facilitate wireless charging of a vehicle, attention is now directed to FIG. 11, where an exemplary method 1100 for facilitating the wireless charging of the vehicle is illustrated. The method 1100 may be implemented by the automatic parking system described and illustrated herein. The particular series of processing steps depicted in FIG. 11 is not intended to be limiting. It is appreciated that the processing steps may be performed in an order different from that depicted in FIG. 11 and that not all the steps depicted in FIG. 11 need be performed.

In some embodiments, the method depicted in method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At 1102, a parking status received from a vehicle, such as vehicle 500 described and illustrated herein, can be sent to a control device associated with the park space, such as the parking space 610 described and illustrated herein. In various embodiments, the control device associated with the parking space can include a computing device, such as a server. For example, the server may be configured to manage and control multiple parking spaces that are configured for wireless charging of vehicles. Such a server may be configured to generate an instruction to activate or deactivate wireless charging provided by a particular parking space, such as the parking space 610. The parking status transmitted at 1102 may including information indicating identifying information of vehicle 500 and information indicating vehicle 500 has been automatically parked inside a parking space, such as the parking space 610.

At 1104, a charging status can be received from the control device and/or the vehicle 500. The charging status can include information indicating a charging session has been successfully started for vehicle 500 at a particular parking space, such as the parking space 610. The charging status can include information indicating a progress of the charging, e.g., the vehicle 500 has been 60% charged by the parking space. In some embodiments, the charging status can include information indicating the charging session was failed due to one or more incidents (e.g., vehicle 500 was not properly parked inside parking space 610 to create the magnetic field). In those embodiments, further guidance information may be generated and transmitted to vehicle 500 to "fine-tune" the parking of vehicle 500 until a success charging status is received from the control device associated with the parking space 610. In some embodiments, the charging status may be periodically or non-periodically received at 1104 during the wireless charging session of the vehicle 500.

At 1106, the charging status received at 1104 can be transmitted to the vehicle 500. The charging status may enable the vehicle 500 to determine whether to deactivate its receiver when the vehicle 500 is fully charged. For example, the charging status transmitted at 1104 may indicate the parking space 610 has charged the vehicle 80%. In that example, this status information can enable the vehicle 500 to determine whether the wireless charging by the parking space 610 has been effective based on the state of the battery system. For instance, if the batty system is only 60% charged, the vehicle 500 may determine the charging session has not been effective, and may determine to stop the charging session to avoid potential damage to the vehicle 500 by the parking space 610 and/or to avoid excessive financial charges by an operator of the parking space 610.

At 1108, a departure status received from the vehicle 500 may be transmitted to the control device associated with the parking space 610. This departure status can indicate vehicle 500 has already left parking space 610 and thus make the parking space 610 available for other vehicle to park and/or wireless charge.

FIG. 8 is an exemplary graphical user interface for an automated vehicle parking system, showing available parking structures on a map, according to another exemplary embodiment of the present disclosure. As show in FIG. 8, as part of an automated parking process a user may be presented with an interface 800, showing a vehicle location 810, roads 820, and structures 830, 840, 850, 860. The interface is modified based on available parking space information to include indicia that structures 830 and 840 have available parking i.e. 8 spaces in structure 830 and 4 spaces in structure 840. The interface 800 includes additional information, such as the parking prices in structures 830, 840 and the hours of operation of structure 830. Of course, a variety of relevant information may be presented depending, for example, on what information the system is able to obtain for the various parking options.

In some examples, the interface 800 may be presented on a user device, such as a smartphone, or the interface 800 may be presented on a vehicle's system. In any event, the user may select one of the available structures to confirm and/or proceed with an automated parking procedure. In some examples, such as where the user does not care to select a specific parking space, or where only one space is available in a given structure, selection of a structure (e.g. 830 or 840) may initiate the automated parking process. In other examples, the selection of a structure may initiate another interface, such as that shown in FIG. 9.

FIG. 9 is another exemplary graphical user interface for an automated vehicle parking system, showing available parking spaces on a map, according to another exemplary embodiment of the present disclosure. FIG. 9 depicts a multilevel parking structure with "Open" designations for available parking spaces. The user can select a specific parking space, e.g. by pressing the corresponding location on a touch screen, and initiate an automatic parking procedure that will park the vehicle in the selected parking space (or alternate space as described below).

In some examples, the interface 900 may be presented on a user device, such as a smartphone, or the interface 900 may be presented on a vehicle's system. In any event, the user may select one of the available spaces to confirm an automated parking procedure. Although FIGS. 8 and 9 depict parking structures, available street parking spaces may also be identified, e.g. by cameras in parking meters or other sensors, and presented to the user for selection. As mentioned previously, in cases where access to a selected parking space is not controlled, e.g. public street parking, exemplary systems may be configured to reroute a vehicle to an alternate space if someone takes the selected space whilst the vehicle is enroute.

In some examples, the user application may provide a navigation application that directs the user to the parked vehicle. This may be based, for example, on the location of the parked vehicle and/or information about the parking structure. In some examples, the user interface may allow for the user to instruct the vehicle to leave the parking structure and to the entrance or the user's location. In cases where the vehicle is instructed to return to the entrance of the parking structure, a process similar to that used to park the vehicle may be reversed, and the vehicle can autonomously return to the entrance. In cases where the vehicle is instructed to return to the user's location, a two-step process may be employed wherein (1) the process used to park the vehicle is reversed, and (2) after the vehicle returns to the of the parking structure, a road navigation route is executed to deliver the vehicle to the location (determined by GPS or other technique).

As will be appreciated considering the foregoing description, the present subject matter allows for full three-dimensional (3D) parking for vehicles, whereby a driver can simply leave the vehicle at front of a store, restaurant or other location, and have the vehicle automatically park itself. Although the foregoing descriptions involve an exemplary back-in procedure, it should also be appreciated that the present subject matter can be adapted to various parking techniques, including S-shaped parking maneuvers (such as a parallel parking along road side), or a "front-in" L-shaped parking maneuver.

In some examples, all of the logic performed by the automated parking process can be performed by random access memory (RAM), avoiding the need to access databases, which can unduly slow the process. This is particularly significant in the context of making an effective 3D system that has to use decision-making/AI/logic, and coordinate/deconflict between various users and/or parking structures in substantially real-time.

Figure 12:
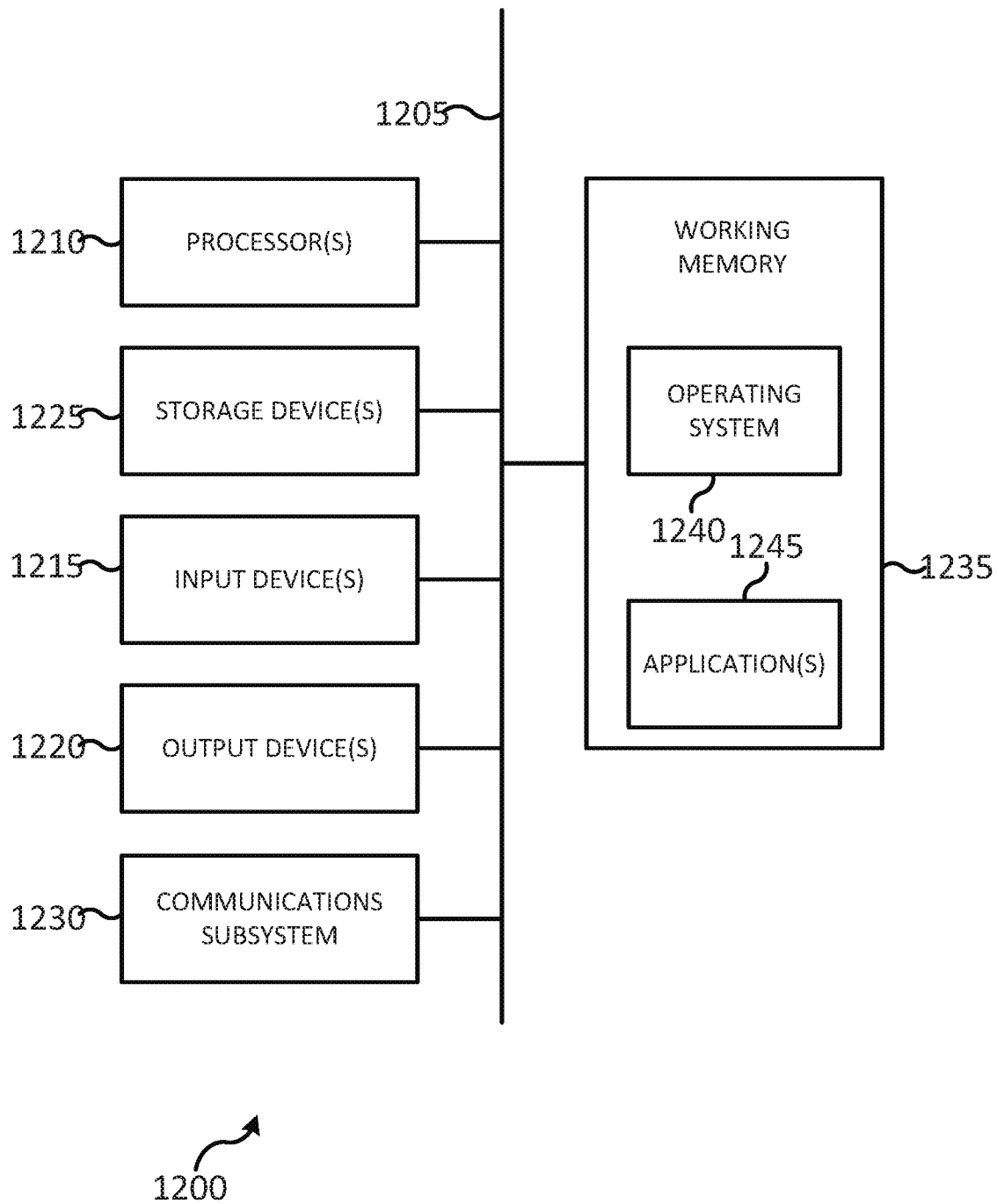
FIG. 12 illustrates a simplified computer system, according to an exemplary embodiment of the present disclosure.

FIG. 12 illustrates a simplified computer system that can be used implement various embodiments described and illustrated herein. A computer system 1200 as illustrated in FIG. 12 may be incorporated into devices such as a portable electronic device, mobile phone, or other device as described herein. FIG. 12 provides a schematic illustration of one embodiment of a computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 12012, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 12112, which can include without limitation a mouse, a keyboard, a camera, and/or the like; and one or more output devices 1220, which can include without limitation a display device, a printer, and/or the like.

The computer system 1200 may further include and/or be in communication with one or more non-transitory storage devices 12212, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an communication device, a wireless communication device, and/or a chipset such as a Bluetooth™ device, an 1202.11 device, a WiFi device, a WiMax device, cellular communication facilities, etc., and/or the like. The communications subsystem 1230 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1230. In other embodiments, a portable electronic device, e.g. the first electronic device, may be incorporated into the computer system 1200, e.g., an electronic device as an input device 12112. In some embodiments, the computer system 1200 will further comprise a working memory 12312, which can include a RAM or ROM device, as described above.

The computer system 1200 also can include software elements, shown as being currently located within the working memory 12312, including an operating system 1240, device drivers, executable libraries, and/or other code, such as one or more application programs 12412, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 12, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 12212 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1200 to perform methods in accordance with various embodiments of the technology. According to a set of embodiments, some or all of the procedures of such methods are performed by the computer system 1200 in response to processor 1210 executing one or more sequences of one or more instructions, which might be incorporated into the operating system 1240 and/or other code, such as an application program 12412, contained in the working memory 12312. Such instructions may be read into the working memory 12312 from another computer-readable medium, such as one or more of the storage device(s) 12212. Merely by way of example, execution of the sequences of instructions contained in the working memory 12312 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 12212. Volatile media include, without limitation, dynamic memory, such as the working memory 12312.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 and/or components thereof generally will receive signals, and the bus 12012 then might carry the signals and/or the data, instructions, etc. carried by the signals to the working memory 12312, from which the processor(s) 1210 retrieves and executes the instructions. The instructions received by the working memory 12312 may optionally be stored on a non-transitory storage device 12212 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above merely illustrative and is not meant to be an exhaustive list of all possible embodiments, applications or modifications of the invention. Those of ordinary skill in the art should be still aware that, parameters in the embodiments disclosed by the present disclosure can be in different manners, and these changes shall fall within the spirit and scope of the present disclosure and the claims. Thus, various modifications and variations of the described and systems of the invention will be apparent to those skilled in the art without departing the scope and spirit of the invention.

What is claimed is:

1. A method of automatically parking a vehicle, comprising:
   receiving a request from a user to park and wireless charge a vehicle, the request including location information of the vehicle and model information about the vehicle;
   searching a database including parking availability information based at least in part on the request, the location information and the model information;
   determining a parking space available for parking based on availability information and wirelessly charging the vehicle based on the searching;
   sending the model information of the vehicle to a control device associated with the parking space;
   generating and transmitting guidance information to the vehicle, wherein the guidance information facilitates the vehicle automatically parking inside the parking space, and wherein the guidance information includes a location where the vehicle is to be automatically parked;
   determining a largest angle between a right wheel center line and a side line of the parking space based on the length between the right wheel center line and the side line of the parking space;
   determining a last turn point for a right rear wheel of the vehicle;
   determining that the vehicle has parked in the parking space based on the largest angle and the last turn point;
   sending a vehicle parking status to the control device, the vehicle parking status indicating the vehicle has parked in the parking space;
   receiving a charging status from the control device and/or the vehicle, the charging status including information regarding a wireless charging session for charging the vehicle through the parking space; and
   receiving a departure status from the vehicle, the departure status indicating that the vehicle has left the parking space.

2. The method of claim 1, wherein the location information includes GPS coordinates, and the search returns results within a predetermined distance of the GPS coordinates.

3. The method of claim 1, wherein the charging status indicating the wireless charging session was successfully started for the vehicle or the wireless charging session was not successfully started for the vehicle.

4. The method of claim 1, wherein the charging status indicating a progress of the wireless charging of the vehicle through the charging session.

5. The method of claim 1, wherein the guidance information further facilitates the vehicle to be automatically driven in a first mode to a predetermined location in proximity to the parking space.

6. The method of claim 1, further comprising sending information related to the parking space to the vehicle, the information related to the parking space including at least one of parking space location information, parking facility information, price information, distance information, or availability timing information.

7. The method of claim 1, further comprising charging the user a parking fee based at least in part on determining that the vehicle has arrived at the parking space, determining that the vehicle has left the available parking space, or the confirmation from the user that the vehicle is to be parked in the available parking space.

8. The method of claim 1, wherein the guidance information further facilitates the vehicle to be automatically driven in a second mode for automatically parking the vehicle in the parking space, wherein the second mode includes interpreting a data category that is not used in the first mode.

9. The method of claim 1, wherein the second mode includes recognition of predetermined guidance markers or signals associated with the available parking space.

10. The method of claim 1, wherein the availability information includes at least one of images, sound waves, radio waves, and/or non-visible light waves that indicates the presence or absence of another vehicle in the parking space.

11. An automatic parking system comprising one or more of a processor configured to perform:
receiving a request from a user to park and wireless charge a vehicle, the request including location information of the vehicle and model information about the vehicle;
searching a database including parking availability information based at least in part on the request, the location information and the model information;
determining a parking space available for parking based on availability information and wirelessly charging the vehicle based on the searching;
sending the model information of the vehicle to a control device associated with the parking space;
generating and transmitting guidance information to the vehicle, wherein the guidance information facilitates the vehicle automatically parking inside the parking space, and wherein the guidance information includes a location where the vehicle is to be automatically parked;
determining a largest angle between a right wheel center line and a side line of the parking space based on the length between the right wheel center line and the side line of the parking space;
determining a last turn point for a right rear wheel of the vehicle;
determining that the vehicle has parked in the parking space based on the largest angle and the last turn point;
sending a vehicle parking status to the control device, the vehicle parking status indicating the vehicle has parked in the parking space;
receiving a charging status from the control device and/or the vehicle, the charging status including information regarding a wireless charging session for charging the vehicle through the parking space; and
receiving a departure status from the vehicle, the departure status indicating that the vehicle has left the parking space.

12. The system of claim 11, wherein the location information includes GPS coordinates, and the search returns results within a predetermined distance of the GPS coordinates.

13. The system of claim 11, wherein the charging status indicating the wireless charging session was successfully started for the vehicle or the wireless charging session was not successfully started for the vehicle.

14. The system of claim 11, wherein the charging status indicating a progress of the wireless charging of the vehicle through the charging session.

15. The system of claim 11, wherein the guidance information further facilitates the vehicle to be automatically driven in a first mode to a predetermined location in proximity to the parking space.

16. The system of claim 11, wherein the processor is further configured to perform sending information related to the parking space to the vehicle, the information related to the parking space including at least one of parking space location information, parking facility information, price information, distance information, or availability timing information.

17. The method of claim 11, wherein the processor is further configured to perform charging the user a parking fee based at least in part on determining that the vehicle has arrived at the parking space, determining that the vehicle has left the available parking space, or the confirmation from the user that the vehicle is to be parked in the available parking space.

18. The method of claim 11, wherein the guidance information further facilitates the vehicle to be automatically driven in a second mode for automatically parking the vehicle in the parking space, wherein the second mode includes interpreting a data category that is not used in the first mode.

* * * * *